(No Model.)
T. F. KENNEY.
BRAKE OPERATING MECHANISM FOR CARS.
No. 524,329. Patented Aug. 14, 1894.
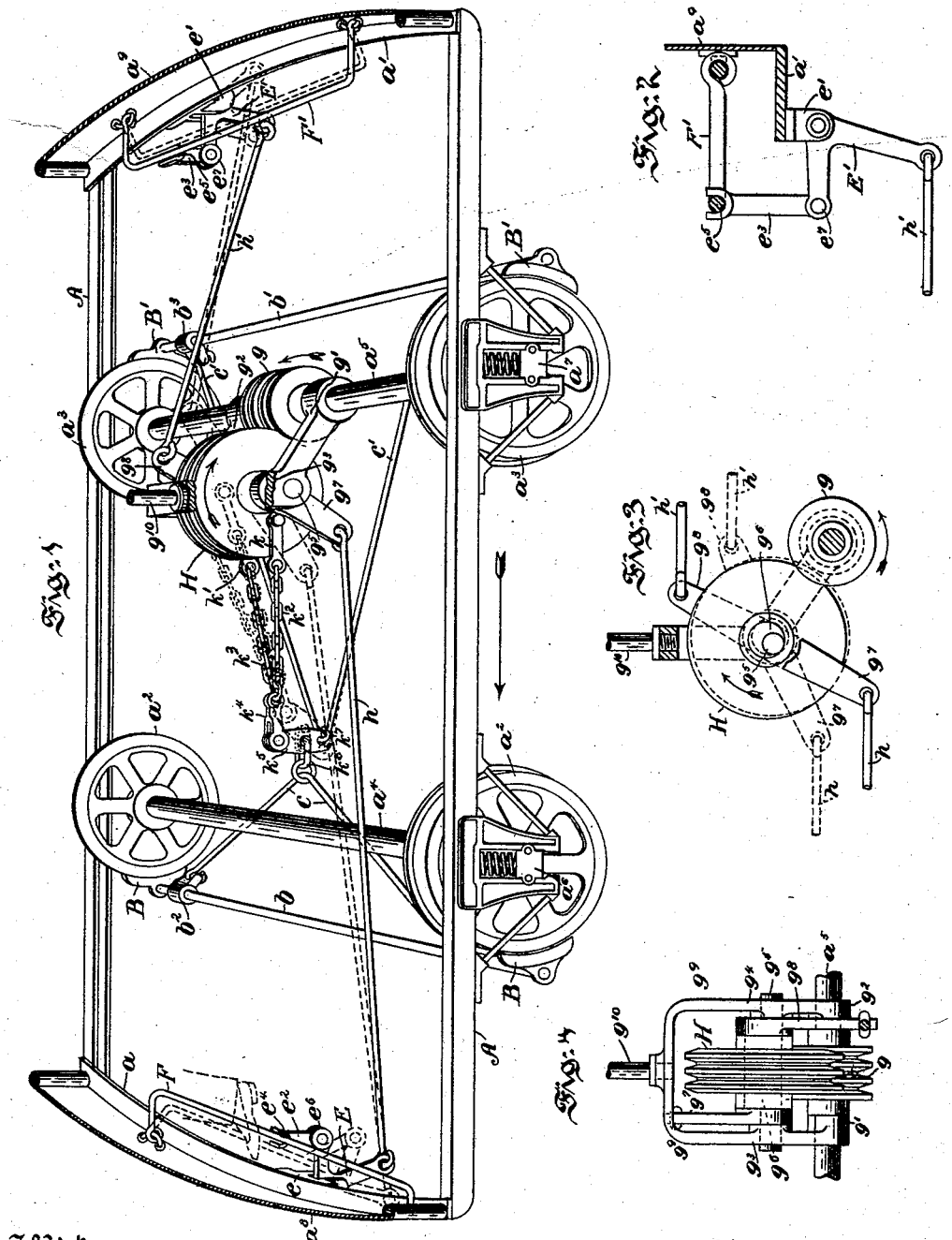
Witnesses:
Richard C. Maxwell
Wilhelm Vogt
Inventor:
Thomas F. Kenney,
by J. Walter Douglass
Attorney.

UNITED STATES PATENT OFFICE.

THOMAS F. KENNEY, OF DARBY, PENNSYLVANIA.

BRAKE-OPERATING MECHANISM FOR CARS.

SPECIFICATION forming part of Letters Patent No. 524,329, dated August 14, 1894.

Application filed December 14, 1893. Serial No. 493,700. (No model.)

*To all whom it may concern:*

Be it known that I, THOMAS F. KENNEY, a citizen of the United States, residing at Darby, in the county of Delaware and State of Pennsylvania, have invented certain new and useful Improvements in Railway-Car-Brake-Operating Mechanism, of which the following is a specification.

My invention has relation in general to the brakes of railway cars; and it relates more particularly to the construction and arrangement of mechanism for operating the brakes of such cars.

The principal objects of my invention are first, to provide a railway car with brake operating mechanism of simple and durable construction and effective action for retarding or stopping a car by a foot action exerted to produce a friction between two members thereof; and second, to provide a brake operating mechanism for railway and other cars so constructed and arranged as that by a foot action exerted upon a series of levers to control an eccentric connected with a movable member, the latter is brought into action to cause by frictional contact of the same with a fixed member, brake shoes to engage the peripheral surfaces of the respective wheels and thereby to quickly retard and stop the car.

My invention stated in general terms, consists of a railway car brake operating mechanism, comprising a lever arm adapted to engage a bell crank mechanism connected with a series of levers pivotally attached to brake-shoes, a grooved rotatable member adapted to frictionally contact with a complemental fixed member mounted on one of the axle shafts and certain of said levers respectively connected with an eccentric or cam lever mounted in the rotatable member on a shaft connected with a frame disposed above or about a grooved rotary fixed member so that by the depression of said lever arm the peripheral surface of the eccentric or cam lever is caused to engage the rotatable member with the fixed member for bringing into action links, chains and levers to cause by the rotation of said member the brake-shoes to respectively engage the wheels of the car; and my invention further consists of a railway car brake operating mechanism constructed and arranged for operation in substantially the manner hereinafter described and claimed.

The nature and objects of my invention will be more fully understood from the following description taken in connection with the accompanying drawings forming part hereof, and in which—

Figure 1, is a perspective view, showing car axle bearings and frame-work and so much of the rear and front platforms of a car as will illustrate the application of the brake operating mechanism of my invention in application thereto. Fig. 2, is a side elevational view of the lever-arm and bell crank mechanism with the recessed pivotal lever-arm connected therewith and adapted for use in connection with the brake operating mechanism of my invention. Fig. 3, is a side elevational view, showing in dotted and full lines respectively the positions of the grooved rotary member in engagement and disengagement with the fixed grooved complemental fixed member mounted on the axle shaft and also showing the eccentric or cam and respective arms thereof frictionally contacting with the internal hub portion of the rotary member for causing the latter to contact with the fixed rotary member in order to retard and stop the car; and Fig. 4, is an end elevational view of the grooved fixed and rotatable members connected with one of the axle shafts and mounted in a frame provided with a pin adapted to extend through the bottom of the car for supporting said frame to required position and to compensate for any abnormal movement of said rotatable member in engagement with said fixed rotary member.

Referring to the drawings A, represents the truck frame of the car provided with end platforms $a$ and $a'$.

$a^2$ and $a^3$, are the front and rear wheels mounted on axle shafts $a^4$ and $a^5$, held in spring boxes $a^6$ and $a^7$.

B and B', are brake-shoes adapted to engage the peripheral surfaces of the front and rear wheels of the car and connected with each other by means of cross-rods $b$ and $b'$.

$b^2$ and $b^3$, are respectively couplings mounted on the brake-shoe rods $b$ and $b'$, and having eyes at the free extremities thereof for the reception of the ends of triangular shaped rods $c$ and $c'$, connected therewith.

$e$ and $e'$, are brackets secured to the under side of the front and rear platforms $a$ and $a'$, of the car and to which are pivoted bell crank levers E and E'.

$e^2$ and $e^3$, are arms provided with transverse grooves or seats $e^4$ and $e^5$, and with opposite knuckle joints $e^6$ and $e^7$, connected with the upper ends of the bell crank levers E and E'.

F and F', are U-shaped lever-arms respectively pivoted to the front and rear dash boards $a^8$ and $a^9$, and adapted respectively to engage with the transversely grooved seats $e^4$ and $e^5$, of the arms $e^2$ and $e^3$.

On one of the axle shafts $a^5$, is mounted and rigidly secured a double grooved pulley $g$. On each side of this grooved fixed pulley $g$, are secured inclined bearing posts $g'$ and $g^2$, provided with vertical arms $g^3$ and $g^4$, forming a U or similar shaped frame $g^9$, provided with a central stud-pin $g^{10}$, adapted to engage with the floor of the car for steadying said frame and preventing abnormal movement of the same and for supporting to position a cross shaft $g^5$.

$g^6$, is a cam or eccentric provided with integral projecting arms $g^7$ and $g^8$, oppositely arranged with respect to each other and having eyes in the ends thereof.

$h$ and $h'$, are longitudinal levers pivotally connected with eyes of the levers $g^7$ and $g^8$, and the lower extremities of the bell crank levers E and E'.

Mounted on the eccentric or cam $g^6$, is a double grooved rotatable wheel or pulley H, adapted to be brought into frictional contact by intermeshing with the grooved fixed pulley $g$. Connected with the end surfaces of the rotatable grooved pulley H, are links $k$ and $k'$, having chains $k^2$ and $k^3$, attached thereto and connected by means of a forked coupling $k^4$, with a vertical link $k^5$.

$k^6$, are chain links connected with the triangular shaped forward arm $c$, of the brake shoe cross rod $b$, and with the vertical link $k^4$, and the rear triangular shaped arm $c'$, is pivotally connected at $k^7$, with the vertical link $k^5$.

The U or similar shaped frame of the rotatable member H, formed integral with the inclined bearing posts $g'$ and $g^2$, having a central stud-pin $g^{10}$, is adapted to engage with the bottom or body of the car so as to maintain said frame to position and also to compensate for any abnormal movement therof, which might be calculated by the vibration of the car to prevent uniformity of action of the rotary grooved friction wheel H, with the fixed grooved pulley $g$.

The operation of the brake operating mechanism hereinbefore described is as follows:—

By depressing one of the U-shaped foot lever arms F or F', pivotally connected with the respective dash-boards $a^8$ and $a^9$, of the car, the bell cranks E and E' are caused to assume the positions indicated by the dotted lines in Fig. 1, and at the same time the lever arms $g^7$ and $g^8$, of the eccentric or cam $g^6$, assume such positions respectively as to cause by contact of the eccentric or cam with the hub portion of the rotatable grooved wheel H, the latter to be brought into contact by intermeshing with the complemental grooved fixed pulley $g$, mounted on the axle shaft $a^5$, and in turn the chains $k^2$ and $k^3$, connected by the links $k$ and $k'$, with the respective surfaces of the rotatable wheel H, to be moved so that the respective rods $c$ and $c'$, controlling the brake-shoes B and B', are actuated and to cause said shoes to firmly contact with the peripheral surfaces of the respective wheels $a^2$ and $a^3$, of the car and thereby to momentarily retard and thus bring the respective wheels to a dead stop. Upon the release of the pressure exerted upon one of the U-shaped lever arms F or F', located respectively at the ends of the car and connected with the dash-boards thereof, the bell crank levers E and E', will assume the positions illustrated in full lines in Fig. 1, thereby releasing the brake-shoes by the eccentric or cam being disconnected with the hub portion of the rotatable member H, and so as to assume the position represented in full lines in Figs. 1 and 3. Consequently the brake mechanism will engage the respective shoes B and B', with the wheels of the car by the simple depression by means of the foot of the bell crank levers E and E', to actuate in opposite directions the lever arms of the eccentric or cam $g^6$, and thereby to cause by the frictional contact of the eccentric or cam of said lever arms with the hub portion of the rotatable member H, the latter to be brought into frictional contact with the fixed intermeshing member $g$, and the car to be retarded and brought to a dead stop by such slight pressure exerted in less than the length of the car and held in such position until it is desired to again start the same. Upon the release of the foot from the U-shaped rod F or F', the mechanism hereinbefore described in returning to its initial position will have a tendency to again start the car, and thereby to lessen the strain upon the horses in starting the dead load.

It will be manifestly obvious that as to minor details modifications may be made as to certain of the parts without departing from the spirit of my invention, hence I do not wish to be understood as limiting myself to the precise arrangement illustrated and as hereinbefore described; but

Having thus described the nature and objects of my invention, what I claim as new, and desire to secure by Letters Patent, is—

1. The combination, in a railway car, of a fixed rotary member mounted on one of the axles of the wheels, a rotatable member mounted in a frame-work and having a cam or eccentric provided with lever arms connected with a bell crank lever at each end of the car, brake-shoes provided with links and chains and connected with said rotatable member and a cross-lever normally engaging with an arm having a recessed seat and connected by a knuckle joint with each bell crank lever and for actuating the same and controlling said brake operating mechanism, substantially as and for the purposes set forth.

2. The combination, with a railway car having brake-shoes, brake operating mechanism provided with fixed and rotatable intermeshing members, whereof one is provided with an internal cam or eccentric having arms connected with a bell crank lever at each end of the car and links and chains connected with the cross-rods of the brake-shoes and with said rotatable member, and a cross lever-arm for controlling the positions of said bell crank levers, substantially as and for the purposes set forth.

3. The combination, in a brake operating mechanism, of a fixed grooved member, an eccentrically controlled rotating member mounted in a frame provided with a stud-pin and bell cranks operated by a foot lever for controlling said brake shoes by the frictional contact of said rotatable member with the fixed member, substantially as and for the purposes set forth.

In testimony whereof I have hereunto set my signature in the presence of two subscribing witnesses.

THOS. F. KENNEY.

Witnesses:
THOMAS M. SMITH,
RICHARD C. MAXWELL.